(12) United States Patent
Kamiya et al.

(10) Patent No.: US 11,092,287 B2
(45) Date of Patent: Aug. 17, 2021

(54) FIBER STRUCTURE, PRESSURE CONTAINER, AND METHOD OF PRODUCING FIBER STRUCTURE

(71) Applicant: KABUSHIKI KAISHA TOYOTA JIDOSHOKKI, Kariya (JP)

(72) Inventors: Ryuta Kamiya, Aichi-ken (JP); Hiroyuki Suzuki, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 7 days.

(21) Appl. No.: 16/606,634

(22) PCT Filed: Apr. 20, 2018

(86) PCT No.: PCT/JP2018/014631
§ 371 (c)(1),
(2) Date: Oct. 18, 2019

(87) PCT Pub. No.: WO2018/193868
PCT Pub. Date: Oct. 25, 2018

(65) Prior Publication Data
US 2020/0072415 A1    Mar. 5, 2020

(30) Foreign Application Priority Data
Apr. 20, 2017    (JP) .............................. JP2017-083504

(51) Int. Cl.
*F17C 1/06* (2006.01)
*B65H 54/16* (2006.01)

(52) U.S. Cl.
CPC .............. *F17C 1/06* (2013.01); *B65H 54/16* (2013.01); *F17C 2201/0109* (2013.01);
(Continued)

(58) Field of Classification Search
CPC ... F17C 1/06; F17C 1/04; B65H 54/16; B65H 54/10
(Continued)

(56) References Cited

U.S. PATENT DOCUMENTS 2,858,992 A  *  11/1958  Wentz .................... B21D 51/24
                                                    242/436
3,047,191 A  *   7/1962  Young .................. B29D 22/003
                                                    220/588
(Continued)

FOREIGN PATENT DOCUMENTS

EP          1 520 683 A2    4/2005
WO       2013035518 A1      3/2013

OTHER PUBLICATIONS

Supplementary European Search Report in European Appln. No. 18787230.4 dated Mar. 18, 2020.

*Primary Examiner* — Robert J Hicks
(74) *Attorney, Agent, or Firm* — Sughrue Mion, PLLC (57) ABSTRACT

A fiber structure that includes a liner, and a fiber reinforcement base material formed of a fabric. The fiber reinforcement base material externally covers a body portion and a dome-shaped portion of the liner, and includes first yarns and second yarns. The first yarns are arranged such that a direction in which a yarn main axis of each of the first yarns in the body portion and the dome-shaped portion proceeds is a circumferential direction of the liner. The second yarns are arranged such that a direction in which a yarn main axis of each of the second yarns in the body portion proceeds is an axial direction of the body portion and that a direction in which a yarn main axis of a portion of each of the second yarns arranged in the dome-shaped portion proceeds is an axial direction of the dome-shaped portion.

5 Claims, 3 Drawing Sheets

(52) U.S. Cl.
CPC .......... *F17C 2203/0604* (2013.01); *F17C 2203/0665* (2013.01); *F17C 2209/2154* (2013.01); *F17C 2221/012* (2013.01); *F17C 2221/014* (2013.01); *F17C 2223/036* (2013.01)

(58) Field of Classification Search
USPC .......... 220/590, 589, 588, 586, 592; 206/0.6
See application file for complete search history.

(56) References Cited

U.S. PATENT DOCUMENTS

| | | | | |
|---|---|---|---|---|
| 3,276,936 | A * | 10/1966 | Uhlig et al. .......... | B29C 53/602 |
| | | | | 156/425 |
| 3,843,010 | A * | 10/1974 | Morse .................. | F17C 1/06 |
| | | | | 220/590 |
| 3,969,812 | A * | 7/1976 | Beck .................. | B21D 51/24 |
| | | | | 29/421.1 |
| 4,410,385 | A * | 10/1983 | Murphy ............... | D06M 23/06 |
| | | | | 156/181 |
| 7,407,062 | B2 * | 8/2008 | Carter ................ | B29C 70/086 |
| | | | | 220/590 |
| 8,038,029 | B2 * | 10/2011 | Lindner ............... | F17C 1/16 |
| | | | | 220/588 |
| 8,858,857 | B2 | 10/2014 | Wood et al. | |
| 9,316,359 | B2 * | 4/2016 | Otsuka ................ | F17C 13/06 |
| 2013/0260630 | A1 * | 10/2013 | Ito ..................... | D03D 1/00 |
| | | | | 442/205 |
| 2015/0362125 | A1 * | 12/2015 | Morales ............... | F17C 1/06 |
| | | | | 220/4.12 |
| 2017/0343158 | A1 * | 11/2017 | Kato .................. | C08G 69/26 |
| 2018/0080607 | A1 * | 3/2018 | Van Haaren ........... | F16J 12/00 |
| 2018/0283609 | A1 * | 10/2018 | Teruhira ............. | B29C 53/822 |
| 2019/0170297 | A1 * | 6/2019 | Criel ................ | F17C 1/06 |

\* cited by examiner

FIBER STRUCTURE, PRESSURE CONTAINER, AND METHOD OF PRODUCING FIBER STRUCTURE

CROSS REFERENCE TO RELATED APPLICATION

This application is a National Stage of International Application No. PCT/JP2018/014631 filed Apr. 5, 2018, claiming priority based on Japanese Patent Applications No. 2017-083504 filed Apr. 20, 2017, the contents of all of which are incorporated herein by reference in their entirety.

The present invention relates to a fiber structure, a pressure container, and a method of producing the fiber structure.

BACKGROUND ART

A pressure container, so-called a high-pressure tank, to contain compressed natural gas (CNG), liquefied natural gas (LNG), or the like is heavy in weight because the pressure container is generally made of metal such as steel and an aluminum alloy. In recent years, automobiles fueled by natural gas attract attention as green vehicles, and also automobiles powered by fuel cells attract attention as greener vehicles. Some of such vehicles store hydrogen gas in a fuel tank to fuel the fuel cells. However, the pressure container used as the fuel tank is heavy in weight, thereby resulting in poor fuel efficiency. To solve the problems described above, a pressure container that has a liner (an inner shell) impermeable to gas and covered with a pressure-resistant fiber-reinforced composite layer is proposed. (See Patent Document 1 below as an example.)

In such a pressure container, a liner generally has curved-surfaced dome-shaped portions at the both ends of the liner in a direction in which the center axis of a cylindrical body portion of the liner extends (hereinafter referred to as an axial direction). Since the pressure container is filled with gas that may have a pressure as high as several tens of MPa, the liner of the pressure container is reinforced with a fiber-reinforced composite layer.

CITATION LIST

Patent Document

Patent Document 1: U.S. Pat. No. 8,858,857

SUMMARY OF INVENTION

Technical Problem

In such a pressure container, an internal pressure stress generated under the gas pressure imposed on the liner is greater in the axial direction of the liner than in the radial direction of the liner. Reinforcement for the liner is therefore important in the axial direction.

An objective of the present invention is to provide a fiber structure reinforcing a liner in an axial direction, a pressure container, and a method of producing the fiber structure.

Solution to Problem

A fiber structure to solve the above problems is a fiber structure that includes a liner, and a fiber reinforcement base material formed of a fabric. The liner includes a body portion having a cylindrical shape, a dome-shaped portion being continuous with at least one end of the body portion in an axial direction, and a mouthpiece having a shape protruding from the dome-shaped portion in the axial direction of the body portion. The fiber reinforcement base material externally covers the body portion and the dome-shaped portion of the liner. The fiber reinforcement base material includes first yarns arranged in such a way that a direction in which a yarn main axis of each of the first yarns in the body portion and the dome-shaped portion proceeds is a circumferential direction of the liner, and second yarns forming the fabric with the first yarns and arranged in such a way that a direction in which a yarn main axis of each of the second yarns in the body portion proceeds is the axial direction of the body portion and that a direction in which a yarn main axis of a portion of each of the second yarns arranged in the dome-shaped portion proceeds is an axial direction of the dome-shaped portion.

According to the fiber structure described above, the direction in which the yarn main axis of each of the first yarns proceeds is the circumferential direction of the liner, which thereby reinforces the liner in a radial direction. The direction in which the yarn main axis of each of the second yarns proceeds is the axial direction of the body portion and the dome-shaped portion of the liner, which thereby reinforce the liner in the axial direction more strongly than in a case where the direction in which the yarn main axis of the second yarn proceeds is angled relative to the axial direction of the body portion and the axial direction of the dome-shaped portion.

In the fiber structure, the fabric may be a multi-layered fabric that includes a first yarn layer in which the first yarns are arranged, a second yarn layer in which the second yarns are arranged, and a binder yarn binding the first yarn layer and the second yarn layer.

In the fiber structure described above, the fiber structure formed of the multi-layered fabric includes the fiber reinforcement base material. During production of a pressure container, a matrix resin is impregnated along the binder yarn into the fiber reinforcement base material through the stacking direction of the fiber reinforcement base material. Impregnation of the matrix resin in the stacking direction of the fiber structure is thereby facilitated, which accordingly reinforces the strength of the layers formed of the fiber reinforcement base material.

A pressure container to solve the above problem is a pressure container that includes a fiber structure impregnated with a matrix resin. The fiber structure includes a fiber reinforcement base material that is formed of a fabric and externally covers a liner.

According to the pressure container described above, a direction in which a yarn main axis of each of first yarns proceeds is a circumferential direction of the liner, which reinforces the pressure container in a radial direction. A direction in which yarn main axis of each of second yarns proceeds is an axial direction of a body portion and a dome-shaped portion of the liner. The pressure container is thereby reinforced in the axial direction more strongly in comparison with a case where the direction in which the yarn main axis of the second yarn proceeds is angled relative to the axial direction of the body portion and the axial direction of the dome-shaped portion.

A method of producing a fiber structure to solve the above problems is the method of producing the fiber structure that includes a liner, and a fiber reinforcement base material formed of a fabric. The liner includes a body portion having a cylindrical shape, a dome-shaped portion being continuous with at least one end of the body portion in an axial direction thereof, and a mouthpiece having a shape protruding from the dome-shaped portion in the axial direction of the body portion. The fiber reinforcement base material externally covers the body portion and the dome-shaped portion of the liner. The fiber structure further includes warp yarns arranged in the body portion and the dome-shaped portion, and weft yarns forming the fabric with the warp yarns. The warp yarns are arranged in such a way that a direction in which a yarn main axis of each of the warp yarns proceeds is a circumferential direction of the liner. The method of producing the fiber structure includes arranging the warp yarns along the axial direction of the body portion and the dome-shaped portion of the liner, inserting each of the weft yarns into a shed formed between the warp yarns adjacent to each other in the axial direction of the liner, pressing the inserted weft yarn towards the liner by beating with a reed to weave the fabric out of the warp yarns and the weft yarn, and winding the woven fabric around the liner by rotating the liner around a center axis of the liner.

According to the method described above, the fabric is woven in a state where the direction in which the yarn main axis of each of the warp yarns proceeds is the circumferential direction of the liner and the direction in which the yarn main axis of each of the weft yarns proceeds is the axial direction of the body portion and the dome-shaped of the liner. The fabric is wound around the liner while being woven. Productivity in producing the fiber structure according to the method described above is enhanced in comparison with, for example, a case where a fabric is woven into a tubular shape by braiding, cut open, and then wound around a liner. Productivity in producing the fiber structure according to the method described above is enhanced also in comparison with a case where yarns are wound around a liner individually one by one to produce a fiber structure, as seen in filament winding.

Advantageous Effects of Invention

The liner is reinforced in the axial direction according to the present invention.

DESCRIPTION OF EMBODIMENTS

A fiber structure, a pressure container, and a method of producing the fiber structure will now be described with reference to an embodiment that embodies the fiber structure used in a high-pressure tank, the high-pressure tank, and a method of producing the fiber structure, shown in FIGS. 1 through 6C.

Figure 1:
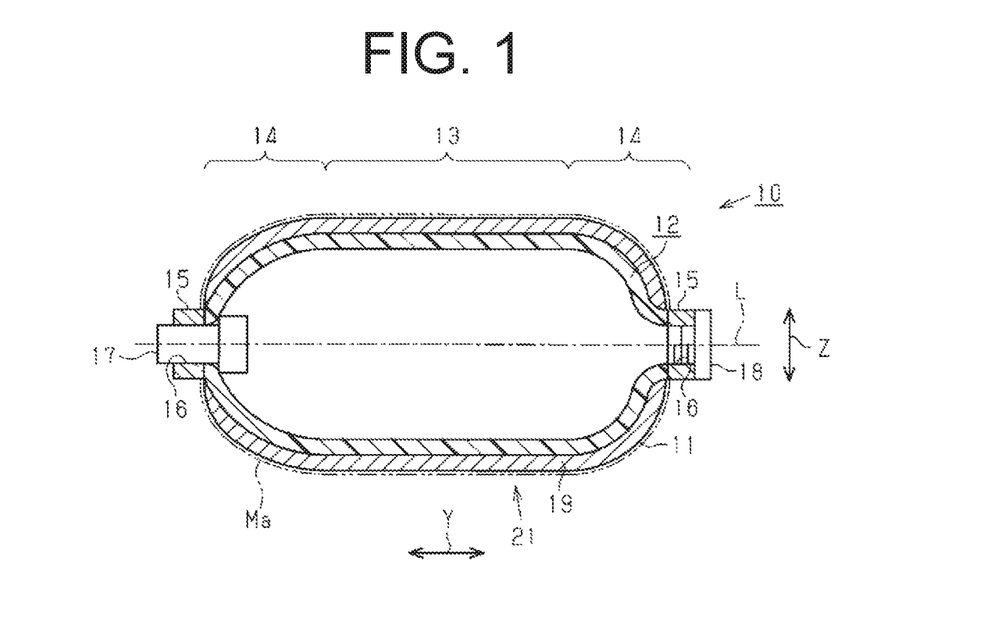
FIG. 1 is a cross-sectional view schematically showing a high-pressure tank.

As shown in FIG. 1, a high-pressure tank 10 serving as a pressure container is formed of a fiber structure 21 impregnated with a matrix resin Ma. The fiber structure 21 includes an elongated hollow-shaped liner 12, and a fiber reinforcement base material 19 that externally covers the liner 12. The liner 12 of the high-pressure tank 10 is reinforced with a fiber-reinforced composite layer 11 formed of the fiber reinforcement base material 19 impregnated with the matrix resin Ma. This secures a pressure resistance (a mechanical strength) of the high-pressure tank 10.

The liner 12 is made of resin, and has an elongated hollow shape. A direction in which a center axis L of the liner 12 extends is referred to as an axial direction. The liner 12 includes a cylindrical body portion 13. A center axis of the body portion 13 coincides with the center axis L of the liner 12. The liner 12 includes a dome-shaped portion 14 at each of both ends of the body portion 13 in an axial direction Y. An axial direction of each of the dome-shaped portions 14 coincides with the axial direction of the liner 12. The liner 12 includes a mouthpiece 15 that outwardly protrudes from each of the dome-shaped portions 14 in the axial direction Y. The mouthpieces 15 are made of metal (e.g. stainless steel). Each of the mouthpieces 15 includes a hole portion 16 that communicates with a space in the liner 12. A valve 17 is fitted into the hole portion 16 of one of the mouthpieces 15 at one end of the liner 12 in the axial direction Y, and a screw 18 is screwed into the hole portion 16 of the other of the mouthpieces 15 at the other end of the liner 12 in the axial direction Y.

The fiber reinforcement base material 19 uses a carbon fiber as a reinforcement fiber according to the present embodiment. The reinforcement fiber is not limited to the carbon fiber, but other reinforcement fibers that are generally said to have high elasticity and high strength may be used, such as glass fibers, silicon-carbide base ceramic fibers, aramid fibers, and ultra-high molecular weight polyethylene fibers.

Figure 2:
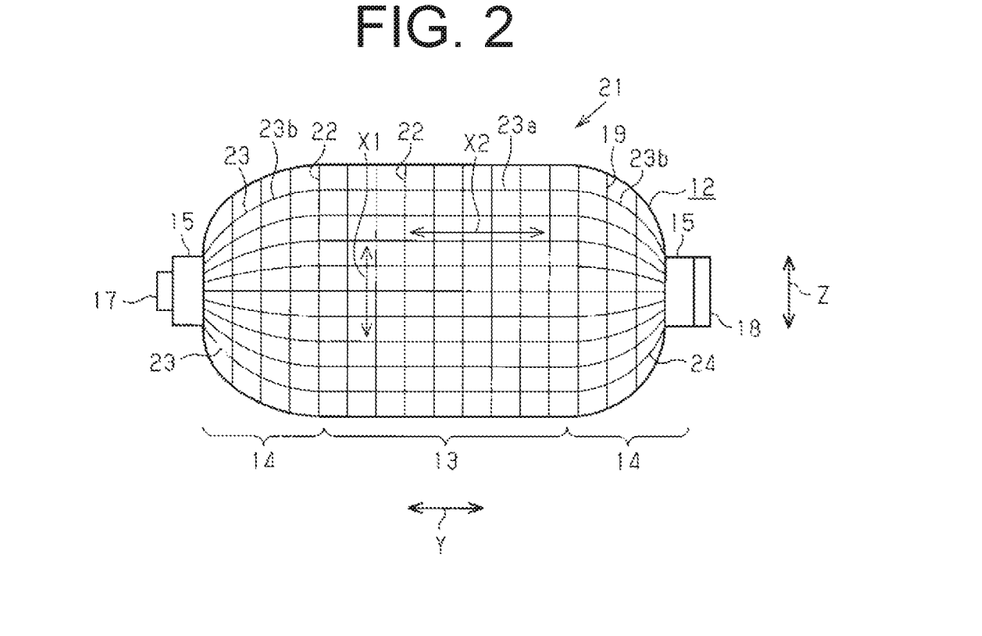
FIG. 2 is a front view schematically showing a fiber structure.
Figure 3:
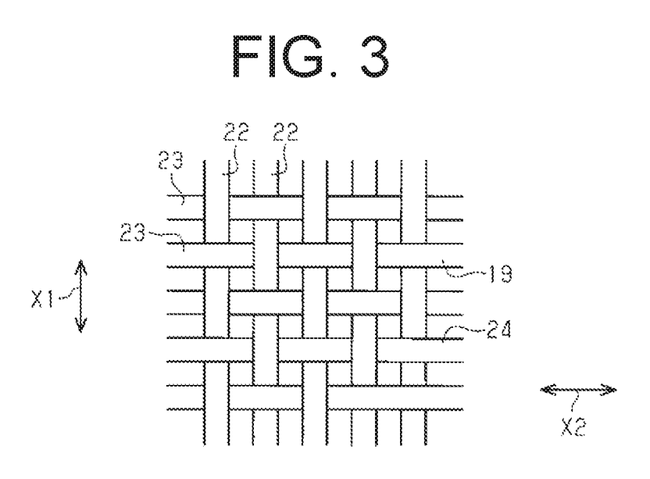
FIG. 3 is an enlarged view showing a fiber reinforcement base material.

As shown in FIG. 2 or 3, the fiber reinforcement base material 19 includes stacked layers of a fabric 24 that is woven with a plain weave out of a plurality of warp yarns 22 corresponding to first yarns and a plurality of weft yarns 23 corresponding to second yarns. Each of the warp yarns 22 and each of the weft yarns 23 are arranged orthogonal to each other. The plurality of warp yarns 22 are arranged in the body portion 13 and the dome-shaped portions 14 in a state where the warp yarns 22 are parallel to one another, along the axial direction Y of the liner 12. A direction X1 in which a yarn main axis of the warp yarns 22 proceeds ahead in the body portion 13 and the dome-shaped portions 14 is a circumferential direction Z of the liner 12. The direction X1 of the yarn main axis of the warp yarns 22 is orthogonal to a radial direction of the liner 12.

The plurality of weft yarns 23 are arranged parallel to one another, along the circumferential direction Z of the liner 12. A portion of each of the weft yarns 23 that proceeds ahead in the axial direction of the liner 12 along the outer peripheral surface of the body portion 13 is a body-portion weft yarn 23a. A portion of each of the weft yarns 23 that proceeds in the axial direction of the liner 12 along each of the outer peripheral surfaces of each of the dome-shaped portions 14 is a dome-portion weft yarn 23b. Each end of the body-portion weft yarn 23a is continuous with each of the dome-portion weft yarns 23b in the axial direction of the liner 12. As to the weft yarns 23, a direction X2 in which a yarn main axis of each of the dome-portion weft yarns 23b proceeds is the axial direction of the liner 12, curving along the each of the curved surfaces of each of the dome-shaped portions 14. Also as to the weft yarns 23, the direction X2 in which a yarn main axis of each of the body-portion weft yarns 23a proceeds is the axial direction of the body portion 13 of the liner 12.

Each of the warp yarns 22 and each of the weft yarns 23 are arranged orthogonal to each other. By making the direction X1 in which the yarn main axis of the warp yarns 22 proceeds coincide with the circumferential direction Z of the liner 12, the liner 12 is reinforced in the radial direction. By making the direction X2 in which the yarn main axis of the weft yarns 23 proceeds coincide with the axial direction of the liner 12, the liner 12 is reinforced in the axial direction.

Figure 4A:
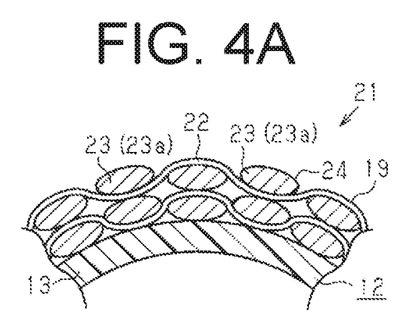
FIG. 4A is an enlarged cross-sectional view showing the fiber reinforcement base material that covers a body portion.
Figure 4B:
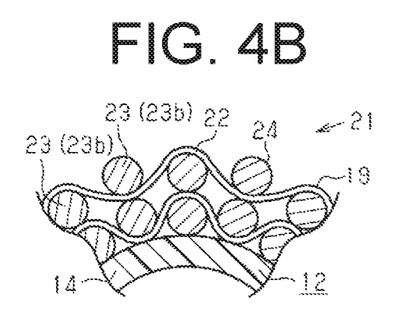
FIG. 4B is an enlarged cross-sectional view showing the fiber reinforcement base material that covers a dome-shaped portion.

As shown in FIG. 4A, the shape, the thickness, and the width of the weft yarns 23 of the body portion 13 are flat, thin, and wide. As shown in FIG. 4B, the thickness and the width of the weft yarns 23 of the dome-shaped portions 14 are thicker and narrower than those of the body-portion weft yarn 23a, and become thicker and narrower even further as the diameter of the dome-shaped portion 14 decreases in a direction from the body portion 13 toward the mouthpiece 15. On the other hand, the thickness and the width of the warp yarns 22 are the same in the body portion 13 and in the dome-shaped portions 14. In the fiber structure 21, the number of the weft yarns 23 in the circumferential direction Z of the liner 12 is the same in the body portion 13 and the dome-shaped portions 14.

A method of producing a high-pressure tank 10 will now be described.

In producing the high-pressure tank 10, the woven fabric 24 is wound around the liner 12 while the warp yarns 22 and the weft yarns 23 are woven with the plain weave.

Figure 5:
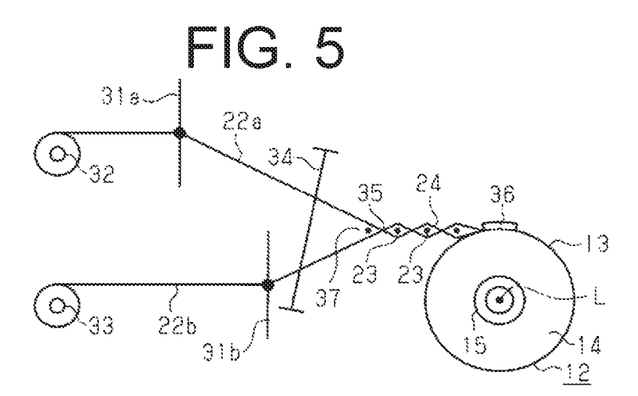
FIG. 5 is a diagram schematically showing a method of producing the fiber structure woven with a loom.

As shown in FIG. 5, the fabric 24 is woven with, for example, a plain-weave loom that includes two heddle frames 31a and 31b used to create a shed between warp yarns 22a and warp yarns 22b of the warp yarns 22 separated upper and lower. The plain-weave loom includes a warp beam 32 that supplies the warp yarns 22a, one of the warp yarns 22a and 22b, and a warp beam 33 that supplies the warp yarns 22b, the other of the warp yarns 22a and 22b. The plain-weave loom has a structure in which one of the warp beams 32 and 33 is arranged at an upper position and the other of the warp beams 32 and 33 is arranged at a lower position. The warp yarns 22a sent out from the warp beam 32, one of the warp beams 32 and 33, is raised and lowered with the heddle frame 314 one of the heddle frames 31a and 31b. The warp yarns 22b sent out from the warp beam 33, the other of the warp beams 32 and 33, is raised and lowered with the heddle frame 31b, the other of the heddle frames 31a and 31b. Eyes of the heddle frames 31a and 31b are indicated with black-filled circles in FIG. 5. A reed 34 is interposed between the two heddle frames of 31a and 31b and a cloth fell 35. Each of the weft yarns 23 is to be inserted in the shed between the warp yarns 22a and 22b using a weft inserting device (not shown). At a position ahead of the cloth fell 35 in the sent-out direction of the warp yarns 22a and 22b, the liner 12 is rotatably supported. The liner 12 rotates around the center axis L.

Figure 6A:
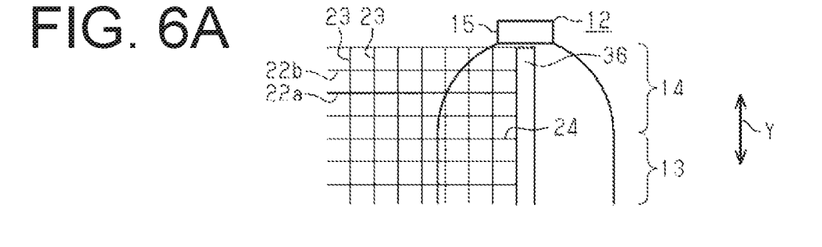
FIG. 6A is a diagram schematically showing a state after weft yarns are inserted.

In weaving the fiber reinforcement base material 19 with the plain-weave loom described above, the ends of a plurality of warp yarns 22a and a plurality of warp yarns 22b that are drawn out of the warp beams 32 and 33 respectively are fixed to the outer peripheral surface of the liner 12 using a fixing member 36 made of, for example, an adhesive tape, as shown in FIG. 6A. The warp yarns 22a and 22b are arranged along the axial direction Y of the liner 12 in the body portion 13 and the dome-shaped portions 14.

By alternately shifting to raise and lower the heddle frames 31a and 31b without rotating the liner 12, the heddle frame 31a, the one of the heddle frames, and the heddle frame 31b, the other of the heddle frames, are shifted in the directions opposite to each other. Then, each of the weft yarns 23 is inserted into a warp shed 37 formed between the warp yarns 22a and 22b every time the warp yarns 22a and 22b adjacent to each other are alternately raised and lowered. The weft yarns 23 have a flat shape after inserted.

Each of the weft yarns 23 is inserted and beaten with the reed 34. Then, the heddle frames 31a and 31b are shifted in the directions opposite to each other so that the shedding state is changed. Subsequently, the next weft insertion is performed. These series of actions described above are repeated so that part of the fabric 24 is woven with the plain weave out of the warp yarns 22 and the weft yarns 23 and the part of the fabric 24 is integrated with the liner 12 into a single piece.

Figure 6B:
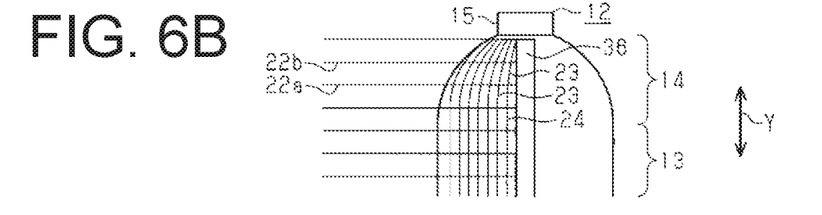
FIG. 6B is a diagram schematically showing a state after the weft yarns are beaten with a reed.

As shown in FIG. 6B, the weft yarns 23 is sent into the fixing member 36 by being beaten with the reed 34. The reed 34 is a member linearly extends in the axial direction of the liner 12. Since the diameter of the dome-shaped portions 14 is smaller than the diameter of the body portion 13, the weft yarns 23 arranged in the dome-shaped portions 14 are pressed further than the portion of the weft yarns 23 arranged in the body portion 13 when beaten with the reed 34, which causes the weft yarns 23 in the dome-shaped portions 14 to be deformed thicker. The resultant deformation in the weft yarns 23 in the dome-shaped portions 14 allows the weft yarns 23 to be arranged parallel to one another, along the circumferential direction Z of the liner 12, even in the state where the body portion 13 has a different diameter from that of the dome-shaped portions 14.

Figure 6C:
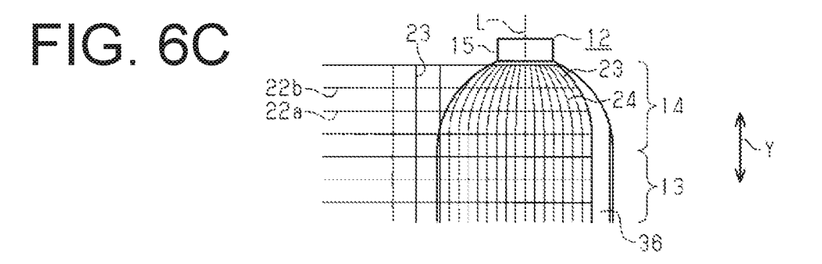
FIG. 6C is a diagram schematically showing a state in which the fiber reinforcement base material is wound around a liner.

Subsequently, as shown in FIG. 6C, the liner 12 is rotated around the center axis L so that the fabric 24 is wound around the liner 12 while the fabric 24 continues to be woven in a like manner as described above. As a result, the fabric 24 is wound around the liner 12 entirely covering the dome-shaped portions 14 and the body portion 13. By winding the predetermined number of the layers of the fabric 24 around the liner 12, the fiber structure 21 that includes the fiber reinforcement base material 19 on the outer peripheral surface of the liner 12 is produced.

In the fiber structure 21 configured as described above, the fiber-reinforced composite layer 11 is formed of the fiber reinforcement base material 19 with the matrix resin Ma impregnated thereinto and hardened, and then, the high-pressure tank 10 is produced with the liner 12 externally covered with the fiber-reinforced composite layer 11. For impregnating and hardening the matrix resin Ma, the resin transfer molding (RTM) method, for example, is used.

The operation of a high-pressure tank 10 will now be described.

The high-pressure tank 10 is used, for example, as a hydrogen-supply source for fuel cells of a fuel cell vehicle. The high-pressure tank 10 is used in a state where a pipe (not shown) is connected to the valve 17. Hydrogen gas is filled into the high-pressure tank 10 through the pipe for filling the hydrogen gas. In the high-pressure tank 10, the hydrogen gas that may have a pressure as high as several tens of MPa, for example, is filled.

When the hydrogen gas is filled into the high-pressure tank 10, the pressure in the high-pressure tank 10 increases so that the liner 12 is pressed from the inside. Great forces are exerted on the liner 12 in the axial direction Y and the radial direction, by which an internal pressure stress is generated. According to the present embodiment, the liner 12 is reinforced in the axial direction by the weft yarns 23 and is reinforced in the radial direction by the warp yarns 22, which suppresses deformation in the high-pressure tank 10.

The above-described embodiment has the following advantages.

(1) In the fiber structure 21 that forms the high-pressure tank 10, the direction X2 in which the yarn main axis of the weft yarns 23 proceeds coincides with the axial direction Y of the body portion 13 and the dome-shaped portions 14. The weft yarns 23 thereby reinforce the liner 12 in the axial direction.

(2) The direction X2 in which the yarn main axis of the weft yarns 23 proceeds curves along the curved surfaces of the dome-shaped portions 14 of the liner 12 toward the axial direction Y in the dome-shaped portion 14. In this state, the weft yarns 23 are not angled relative to the axial direction Y. Even the dome-shaped portion 14 is thereby reinforced in the axial direction Y.

(3) The weft yarn 23 that is just inserted is beaten with the reed 34 to be sent to the weft yarn 23 that has been previously inserted, which allows the weft yarns 23 to be arranged closely one another along the circumferential direction Z of the liner 12. In the dome-shaped portions 14 that have smaller diameters than the body portion 13 has, the weft yarns 23 are beaten and pressed by the reed 34, which allows the weft yarns 23 to be arranged parallel to one another even in the dome-shaped portions 14 and which also prevents from generating wrinkles. The density of the weft yarns 23 is thereby the same in the body portion 13 and the dome-shaped portions 14, and wrinkles are prevented from being generated in the fiber structure 21 even on the curved surfaces of the dome-shaped portions 14.

(4) An example of a conventional method of producing the fiber structure 21 that includes the fiber reinforcement base material 19 externally covering the liner 12 may be filament winding. In this method, productivity is low because yarns are wound around the liner 12 individually one by one. On the other hand, the productivity in producing the fiber structure 21 according to the present embodiment is enhanced as compared to the filament winding, because the fabric 24 is wound around the liner 12 while the fabric 24 is woven out of the warp yarns 22 and the weft yarns 23.

Another example of a conventional method of producing the fiber structure 21 that includes the fiber reinforcement base material 19 on the outer peripheral surface of the liner 12 may be braiding, in which a fabric is woven into a tubular shape to fit to the shape of the liner 12 by braiding, cut open into a flat shape, and then wound around the liner 12, In contrast to this conventional method, the fiber reinforcement base material 19 according to the present embodiment is wound around the liner 12 while the fiber reinforcement base material 19 is woven out of the warp yarns 22 and the weft yarns 23, which does not require an individual process to weave the fabric, a process to cut open the fabric, and a process to paste the fabric to the liner. Productivity is thereby enhanced as compared to the braiding. The liner 12 according to the present embodiment is reinforced in the axial direction because the direction X2 in which the yarn main axis of the weft yarns 23 proceeds is the axial direction of the liner 12.

Figure 7:
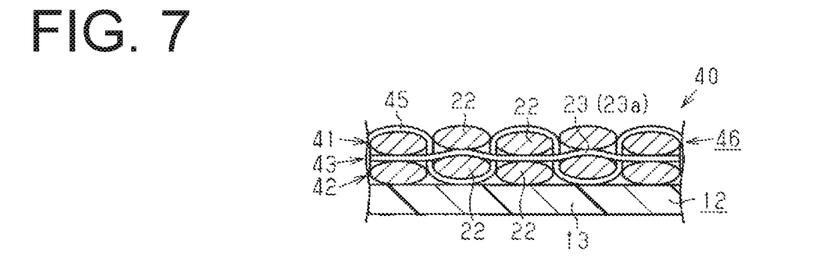
FIG. 7 is a partial cross-sectional view showing a high-pressure tank of another example.

The following modifications may be made to the embodiment described above. As shown in FIG. 7, a fiber reinforcement base material 40 may be a multi-layered fabric woven with multilayer weaving. The fiber reinforcement base material 40 includes warp layers 41 and 42 corresponding to first yarn layers in which warp yarns 22 are arranged parallel to one another, a weft layer 43 corresponding to a second yarn layer in which weft yarns 23 are arranged parallel to one another, and a binder yarn 45 that binds the warp layers 41 and 42 and the weft layer 43 in the stacking direction. The binder yarn 45 proceeds around the outer surface of one of the warp yarns 22 that form the warp layer 41, proceeds through the warp layer 41 in the stacking direction, and then proceeds around the outer surface of another of the warp yarns 22 that form the warp layer 42.

In a fiber structure 46 including the fiber reinforcement base material 40 described above, a matrix resin (not shown) is impregnated along the binder yarn 45 into the fiber reinforcement base material 40 through the stacking direction of the fiber reinforcement base material 40. The fiber structure 46 is thereby reinforced also in the stacking direction. The number of the warp layers and the weft layers may be appropriately changed.

In the embodiment described above, the fiber reinforcement base material 19 includes the stacked layers of the fabric 24 that is woven with the plain weave. The scope of the present invention is not limited to the embodiment described above. For example, the fiber reinforcement base material 19 may include the stacked layers of a fabric that is woven with a satin weave or a twill weave out of a plurality of the warp yarns 22 corresponding to the first yarns and a plurality of the weft yarns 23 corresponding to the second yarns.

In the embodiment described above, the warp yarn 22 is referred to as the first yarn, and the weft yarn 23 is referred to as the second yarn. However, the weft yarn 23 may be referred to as the first yarn and the warp yarn 22 may be referred to as the second yarn.

The liner 12 may have a shape in which one end of the body portion 13 in the axial direction Y is continuous with the dome-shaped portion 14 and the other end of the body portion 13 in the axial direction Y is continuous with a flat bottom surface. In this case, the mouthpiece 15 is provided only to the one end of the line 12 in the axial direction Y where the dome-shaped portion 14 is disposed.

The liner 12 may be entirely made of aluminum or aluminum alloy. The mouthpiece 15 may be made of metal other than stainless steel.

The body portion 13 and the dome-shaped portions 14 of the liner 12 may be welded into a single piece, instead of being separated.

The high-pressure tank 10 in the embodiment described above is used as a hydrogen-supply source for fuel cells to be mounted on a fuel cell vehicle. The scope of the present invention is not limited to the embodiment. For example, the high-pressure tank 10 may be used as a hydrogen-supply source to power a hydrogen engine or may be used for a heat pump. Alternatively, the high-pressure tank 10 may be used as a hydrogen-supply source for fuel cells for household use.

The high-pressure tank 10 in the embodiment described above is used to store hydrogen as the pressure container. The scope of the present invention is not limited to the embodiment. For example, the pressure container may be used to store other types of gases such as nitrogen and compressed natural gas.

REFERENCE SIGNS LIST

L center axis
Y axial direction

Z circumferential direction
Ma matrix resin
X1, X2 direction of yarn main axis
10 high-pressure tank as pressure container
12 liner
13 body portion
14 dome-shaped portion
15 mouthpiece
19, 40 fiber reinforcement base material
21, 46 fiber structure
22 warp yarn as first yarn
23 weft yarn as second yarn
24 fabric
41, 42 warp layer as first yarn layer
43 weft layer as second yarn layer
45 binder yarn

The invention claimed is:

1. A fiber structure, comprising:
a liner including:
   a body portion having a cylindrical shape;
   a dome-shaped portion being continuous with at least one end of the body portion in an axial direction thereof; and
   a mouthpiece having a shape protruding from the dome-shaped portion in the axial direction of the body portion; and
a fiber reinforcement base material formed of a fabric, the fiber reinforcement base material externally and entirely covering the body portion and the dome-shaped portion of the liner, wherein
the fiber reinforcement base material includes:
   first yarns arranged in such a way that a direction in which a yarn main axis of each of the first yarns in the body portion and the dome-shaped portion proceeds is a circumferential direction of the liner; and
   second yarns forming the fabric with the first yarns, the second yarns being arranged in such a way that a direction in which a yarn main axis of each of the second yarns in the body portion proceeds is the axial direction of the body portion and that a direction in which a yarn main axis of a portion of each of the second yarns arranged in the dome-shaped portion proceeds is an axial direction of the dome-shaped portion.

2. The fiber structure according to claim 1, wherein the fabric is a multi-layered fabric comprising:
a first yarn layer in which the first yarns are arranged;
a second yarn layer in which the second yarns are arranged; and
a binder yarn binding the first yarn layer and the second yarn layer.

3. A pressure container, comprising:
a fiber structure impregnated with a matrix resin, the fiber structure including:
   a fiber reinforcement base material formed of a fabric, the fiber reinforcement base material externally covering a liner, wherein
the fiber structure is the fiber structure according to claim 1 impregnated with a matrix resin.

4. A method of producing a fiber structure, the fiber structure comprising:
a liner including:
   a body portion having a cylindrical shape;
   a dome-shaped portion being continuous with at least one end of the body portion in an axial direction thereof; and
   a mouthpiece having a shape protruding from the dome-shaped portion in the axial direction of the body portion; and
a fiber reinforcement base material formed of a fabric, the fiber reinforcement base material externally covering the body portion and the dome-shaped portion of the liner;
warp yarns arranged in such a way that a direction in which a yarn main axis of each of the warp yarns in the body portion and the dome-shaped portion proceeds is a circumferential direction of the liner; and
weft yarns forming the fabric with the warp yarns,
wherein the method of producing the fiber structure comprising:
arranging the warp yarns along the axial direction of the body portion and the dome-shaped portion of the liner;
inserting each of the weft yarns into a shed formed between the warp yarns adjacent to each other in the axial direction of the liner;
pressing the inserted weft yarn toward the liner by beating with a reed to weave the fabric out of the warp yarns and the weft yarns; and
winding the woven fabric around the liner by rotating the liner around a center axis of the liner.

5. The fiber structure according to claim 1, wherein the second yarns are arranged in such a way that an end of each of the second yarns in the body portion is continuous with each of the second yarns arranged in the dome-shaped portion in the axial direction of the liner.

* * * * *

UNITED STATES PATENT AND TRADEMARK OFFICE
CERTIFICATE OF CORRECTION

PATENT NO. : 11,092,287 B2
APPLICATION NO. : 16/606634
DATED : August 17, 2021
INVENTOR(S) : Kamiya et al.

It is certified that error appears in the above-identified patent and that said Letters Patent is hereby corrected as shown below:

On the Title Page

Left column, PCT Filed item (22):
Delete "Apr. 20, 2018"
Insert --Apr. 5, 2018--

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*